United States Patent
Trantham et al.

(10) Patent No.: US 12,524,356 B2
(45) Date of Patent: Jan. 13, 2026

(54) MEMORY TUNNELING INTERFACE

(71) Applicant: Seagate Technology LLC, Fremont, CA (US)

(72) Inventors: Jon D. Trantham, Chanhassen, MN (US); Steven Scott Williams, Longmont, CO (US); Paul M. Wiggins, Longmont, CO (US); Thomas V. Spencer, Fort Collins, CO (US)

(73) Assignee: Seagate Technology LLC, Fremont, CA (US)

( * ) Notice: Subject to any disclaimer, the term of this patent is extended or adjusted under 35 U.S.C. 154(b) by 757 days.

(21) Appl. No.: 17/704,553

(22) Filed: Mar. 25, 2022

(65) Prior Publication Data

US 2023/0305972 A1    Sep. 28, 2023

(51) Int. Cl.
*G06F 13/16* (2006.01)
*G06F 9/30* (2018.01)
*G06F 9/448* (2018.01)

(52) U.S. Cl.
CPC ...... *G06F 13/1668* (2013.01); *G06F 9/30101* (2013.01); *G06F 9/4498* (2018.02); *G06F 13/1663* (2013.01)

(58) Field of Classification Search
CPC ...... G06F 12/00; G06F 13/00; G06F 13/1668; G06F 13/1663; G06F 9/4498; G06F 9/30101

See application file for complete search history.

(56) References Cited

U.S. PATENT DOCUMENTS

| | | |
|---|---|---|
| 5,517,453 A | 5/1996 | Strain et al. |
| 6,670,669 B1 | 12/2003 | Kawamura |
| 6,934,194 B2 | 8/2005 | Takahashi et al. |
| 7,366,016 B2 | 4/2008 | Kato et al. |
| 7,894,364 B2 | 2/2011 | Baron et al. |
| 8,051,180 B2 | 11/2011 | Mazzaferri et al. |
| 8,203,884 B2 | 6/2012 | Kito et al. |
| 8,544,080 B2 | 9/2013 | Arauz Rosado |
| 8,578,076 B2 | 11/2013 | Van Der Linden et al. |
| 8,855,138 B2 | 10/2014 | Horn et al. |
| 9,021,182 B2 | 4/2015 | Park et al. |
| 9,077,590 B2 | 7/2015 | Goel et al. |
| 9,118,687 B2 | 8/2015 | Murphy et al. |
| 9,391,800 B2 | 7/2016 | Rangarajan et al. |
| 9,620,232 B2 | 4/2017 | Nam |
| 9,641,957 B2 | 5/2017 | Raleigh |

(Continued)

*Primary Examiner* — Tim T Vo
(74) *Attorney, Agent, or Firm* — Mueting Raasch Group (57) ABSTRACT

An apparatus may include a memory device, a memory controller, or both that can communicate via memory standard interfaces. However, the memory device may have physical memory that does not comply with the memory standard by itself. Disclosed herein are solutions that allow various non-standard types of memory, or emerging memory, to be utilized via a host, microprocessor, or memory controller that implements the interface standard. For example, by utilizing a command converter at the microprocessor and a tunneling register at the memory device, a microprocessor can send commands to the memory device by writing them to the tunneling register, which can then be processed at the memory device for operations to be performed with the non-standard or emerging memory.

19 Claims, 7 Drawing Sheets

(56) References Cited

U.S. PATENT DOCUMENTS

| | | |
|---|---|---|
| 9,667,485 B2 | 5/2017 | Murphy et al. |
| 9,760,502 B2 | 9/2017 | Raam |
| 9,800,494 B2 | 10/2017 | Sindhu et al. |
| 9,851,910 B2 | 12/2017 | Cohen et al. |
| 10,025,737 B2 | 7/2018 | Qawami et al. |
| 10,025,747 B2 | 7/2018 | Swarbrick et al. |
| 10,541,916 B2 | 1/2020 | De et al. |
| 10,628,353 B2 | 4/2020 | Prabhakar et al. |
| 10,725,909 B2 | 7/2020 | Yanagidaira et al. |
| 10,783,032 B2 | 9/2020 | Lai et al. |
| 10,838,884 B1 * | 11/2020 | Magudilu Vijavaraj ............... G06F 13/161 |
| 10,860,213 B2 | 12/2020 | Singh et al. |
| 10,936,251 B2 | 3/2021 | Cohen et al. |
| 11,082,453 B2 | 8/2021 | Reddem et al. |
| 2014/0201463 A1 | 7/2014 | Blankenship et al. |
| 2015/0302904 A1 * | 10/2015 | Yoon ............... G11C 5/04  711/147 |
| 2017/0070923 A1 | 3/2017 | Li et al. |
| 2022/0114118 A1 * | 4/2022 | Lee ............... G06F 3/061 |

* cited by examiner

Register Groups
- Can be addressed via bank address value.
- For future expansion, additional sets of registers can be allocated by setting indicator bits

| CA[13:11] | Group Name | Primary Purpose | Direction |
|---|---|---|---|
| 502 — 000 | Status | Command Completion & error status | Read-Only |
| 504 — 001 | Aux Control | Debug control, media health requests, power-down requests | Write (readable for debug) |
| 506 — 010 | Data | 64B read data holding registers | Read/Write |
| 508 — 011 | Command | Provides memory address, tag, and command | Write (readable for debug) |

FIG. 5

Command Registers, bank addr b101

| Col Addr [10:4] | Name | Contents |
|---|---|---|
| 0 (b0000000) | R/W Command Register | Cmd #0 Address [40 bits] W/R [1 bit] Tag [7 bits] Metadata[6b] Rsvd[9 bit]<br>...<br>Cmd #7 Address [40 bits] W/R [1 bit] Tag [7 bits] Metadata[6b] Rsvd[9 bit] |
| 1 (b0000001) | Partial Write Register | Cmd #0 Address [40 bits] Tag [7 bits] ByteMasks[64 bits] Metadata[6b] Rsvd[395 bits] |

FIG. 6

Status Registers

Status Registers, bank addr b000

| Col Addr [10:4] | Contents |
|---|---|
| 0 (b0000000) | Command #0 Complete[1b]...Command #127 Complete[1b] Command #0 Error/Non-zero Metadata present[1b]... Command #127 Error/Non-zero Metadata present[1b] |
| 1 (b0000001) | Dies per package [16b] Capacity per die in Gb (e.g., 64, 128, 256) [16b] \| Max parallel reads [32b] \| Max parallel writes [32b] \| Read register counter [32b] \| Write register count [32b] |
| 2 (b0000010) | Die temperature entry / entries [32b / entry] |
| 3 (b0000011) | Part Serial #, die XY location, mfg date, etc. [64B] |
| 4 (b0000100) | Unique ID: ASCII 'S' 'T' 'X' [24 bits] \| Part Ready Status bits |
| 5-7 | Reserved |
| 8 (b0001000) | Command #0 Detailed Status[2b] & Metadata[6b]... Cmd #63 Detailed Status[2b] & Metadata[6b] |
| 9 (b0001001) | Command #64 Detailed Status[2b] & Metadata[6b]... Cmd #127 Detailed Status[2b] & Metadata[6b] |
| 10- | Reserved |

Detailed Status: 00 = no error, 01 = uncorrectable, 10 = correctable/near threshold, 11 = reserved

FIG. 7

Data Holding Registers, (bank addr = b100)

| Col Addr [10:4] | Name | Contents |
|---|---|---|
| 0 (b0000000) | Tag #0 Data Holding Register | Data [64 bytes] |
| 1 (b0000001) | Tag #1 Data Holding Register | Data [64 bytes] |
| ... | ... | ... |
| 126 (b1111110) | Tag #126 Data Holding Register | Data [64 bytes] |
| 127 (b1111111) | Tag #127 Data Holding Register | Data [64 bytes] |

FIG. 8

MEMORY TUNNELING INTERFACE

SUMMARY

In certain embodiments, an apparatus can comprise a memory device and a memory controller. A memory device can include physical memory that does not meet a requirement of a memory standard; a first interface configured to operate per requirements of the memory standard; a register configured to be accessed by a memory controller via the first interface; and a first state machine configured to determine when a command from the memory controller is stored in the register and perform a data storage operation on the physical memory based on the command. The memory controller can include a second interface configured to receive a command from a processor, the command intended for storing data to or retrieving data from the physical memory of the memory device; a second state machine configured to convert the command into a register access command that includes a write to the register of the memory device; and a third interface configured to be coupled to the first interface via a data bus and allow data to be stored to and retrieved from the memory device via writing the register access command to the register.

In certain embodiments, a device can comprise a memory device including physical memory that does not meet a requirement of a memory standard; a first interface configured to operate per requirements of the memory standard; a register configured to be accessed by a memory controller via the first interface; and a first state machine configured to determine when a command from the memory controller is stored in the register and perform a data storage operation on the physical memory based on the command.

In certain embodiments, an apparatus can comprise a memory controller including a first interface configured to receive a command from a processor, the command intended for a physical memory that is not directly addressable by the memory controller; a state machine configured to convert the command into a register access command that includes a write to an addressable logic register associated with the physical memory; and a second interface configured to be coupled, via a data bus, to a memory device including the physical memory, the second interface further configured to allow data to be stored to and retrieved from the physical memory via writing the register access command to the addressable logic register.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, Application Specific Integrated Circuits (ASICs), programmable logic arrays such as Field-Programmable Gate Arrays (FPGAs), and other hardware devices can likewise be constructed to implement the methods and functions described herein. Methods and functions may be performed by modules, which may include one or more physical components of a computing device (e.g., logic, circuits, processors, sensors, etc.) configured to perform a particular task or job, or may include instructions that, when executed, can cause a processor to perform a particular task or job, or may include any combination thereof. Further, the methods described herein may be implemented as a computer readable storage medium or memory device including instructions that, when executed, cause a processor to perform the methods.

"Emerging Memories" in this document generally refers to memories other than standard commonplace DRAM components, such as DDR5-DRAM chips. Examples of emerging memories include Ferroelectric RAM (FeRAM), Magnetic RAM (MRAM), resistive RAM (ReRAM), phase-change memories, and Carbon nano-tube memories (CNT), to name a few, but even non-standard DRAM devices can be considered an emerging memory. Emerging memories often have attributes that do not allow attachment to a standard memory interface, such as timing or configurations (row/page sizes, banks, capacities, etc.) that are not compliant with commonly used memory interface standard requirements, such as Double-Data-Rate Synchronous-Dynamic-Random-Access-Memory (DDR-SDRAM or DDR-DRAM), (e.g., any of the JESD79 standards, and in a specific example JESD79-5A (DDR5-SDRAM), revision A). For these reasons, emerging memories may not be directly addressable by a memory controller, which can require an expensive redesign of a memory controller for it to be able to directly address an emerging memory.

To create a new interface or interface standard for an emerging memory can be timely, costly, or both. In addition to the interface itself, significant investment may be required for the ancillary technology ecosystem around the interface, such as test equipment and verification Intellectual Property (IP). For these reasons it is highly desirable to use existing interfaces already available in FPGA chips, processors, ASICs, and from silicon IP suppliers, etc., rather than to develop a new interface. But adapting the emerging memory to the interface may be difficult or impossible. Emerging memories may have different performance, row or bank arrangements, page sizes, refresh characteristics, etc. than a commonly used interface standard DRAM.

Solutions to these problems are presented herein. For example, the following solutions allow an unmodified, standard compliant DDR-DRAM interface to connect to an emerging memory whose memory cell characteristics or arrangements are different than those of DRAM memory chips and might not comply with the respective standard without these solutions.

As disclosed herein, solutions are provided that allow use of an otherwise non-standard compliant memory with a standard compliant memory interface by implementing a register architecture and tunneling protocol, such as through memory-mapped registers whose arrangement and performance is compliant with the interface standard. In some embodiments, a memory can have a series of low-latency always-accessible registers for receiving or sending commands and data from or to the memory controller using the DDR-DRAM protocol and associated hardware (physical interfaces (phys), memory controllers, termination circuitry, etc.), along with off-the-shelf DDR-DRAM test equipment and verification IP.

Figure 1A:
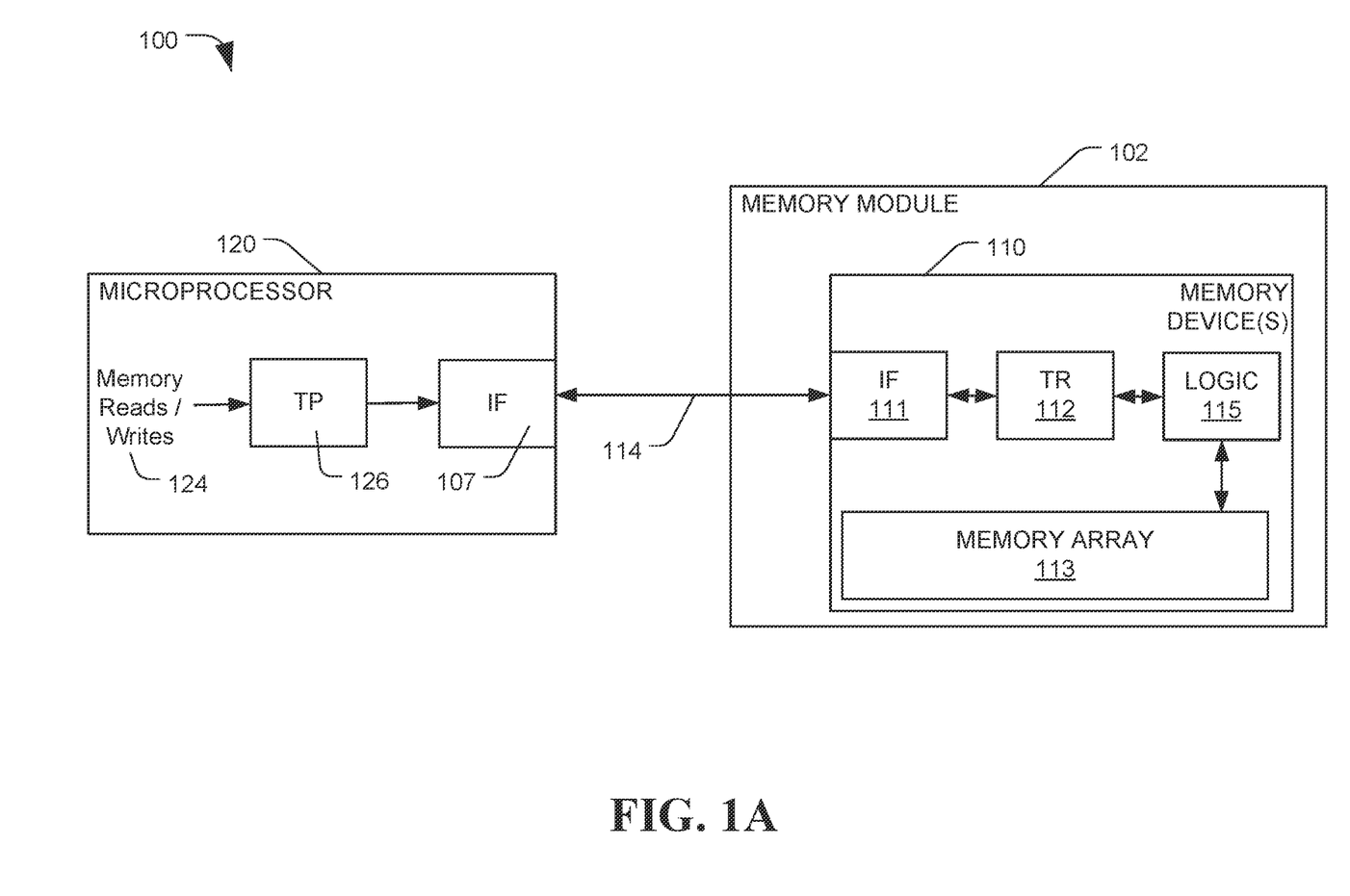
FIG. 1A is a block diagram of a system with a memory tunneling interface, in accordance with certain embodiments of the present disclosure.

Referring to FIG. 1A, a block diagram of an example system 100 with a memory tunneling interface is shown, in accordance with certain embodiments of the present disclosure. The system 100 can include a memory module 102 that can be coupled to a microprocessor 120, such as may be in a host computing device. The memory module 102 and the microprocessor 120 can be communicatively coupled via an interface, such as Compute Express Link (CXL), Peripheral Component Interconnect Express (PCIe) interface, or another interface. In some embodiments, the memory module 102 may be a data storage device such as a non-volatile data storage device with FerroElectric or other non-volatile memory to form a solid-state drive (SSD), or even a hybrid drive having a mixture of media such as disc data storage medium and solid-state nonvolatile memory. Memory module 102 may also be any other type of device that has a memory controller and solid-state memory.

The memory module 102 can include one or more solid state memory devices 110. The microprocessor 120 may include an interface 107 that complies with a specific interface standard, such as for DDR5-DRAM, which allows for data signals to be passed to and from the memory device(s) 110 over a standard interface bus 114. The microprocessor 120 may also include a tunneling protocol module (TP) 126 configured to send or receive commands or data to the memory device(s) 110 via a tunneling mechanism, such as described herein.

The memory device(s) 110 may contain a memory data array 113 within the memory device 110 that does not conform to a specific interface standard, however, the memory device(s) 110 can include an interface 111 that does comply with the specific interface standard. That is, the physical memory 113 has one or more attributes that do not allow attachment to a standard memory interface. The interface 111 may be part of the memory array die(s) or may be on a separate die. The memory array 113 may contain multiple memory array dies such as in a multi-chip module. The memory device(s) may also include one or more tunneling register(s) (TR) 112, which may include multiple registers, coupled to logic 115 for performing storage and retrieval to and from the memory array. Further examples of tunneling protocol modules and tunneling registers are provided below. The TR 112 may be one or more addressable logic registers within a memory circuit.

During operation, the microprocessor 120 and the memory device(s) 110 may utilize the tunneling protocol module 126 and the TR 112 to allow for data storage and retrieval at rates different than the frequency set by the interface clock. Common memory transfer sizes for data storage and retrieval in modern computers are typically 64-byte (cache) lines, however the principals of this design are generally amenable to other sizes, down to a byte. The microprocessor 120 may utilize the tunneling protocol module 126 and the TR 112 to allow for more operations to be executed in parallel than what is allowed by the banking design of the specific interface standard. In some examples, the memory arrays within device(s) 110 may not be performant-compliant with an interface standard and are not directly accessible by microprocessor 120. The data or operations, or both, can be stored into or access specific tunneling register(s). Once something is stored in the tunneling register(s), the memory device(s) 110 can perform operations on what was stored and process the stored commands and data regardless of the specific interface standard between the microprocessor 120 and the memory device(s) 110. More possible operations and implementation details are provided below.

The microprocessor 120 further contains logic for the tunneling protocol 126. The tunneling protocol 126 may be implemented in hardware or may be implemented as a device driver in software. In either case, the TP logic 126, presents to the software in the microprocessor as a memory, and implements the tunneling protocol for the system. The memory array's 113 differing characteristics (e.g., non-volatility, performance compared to conventional memory) may be communicated to the microprocessor 120 via device attribute tables to the software or BIOS, so that software or hardware within the microprocessor 120 may select when to use the memory 113. Software running in microprocessor 120 may access the memory 113 using conventional loads and stores (e.g., memory read and write commands 124 along with data to be stored) communicated to the TP logic 126. The TP logic 126 performs these loads and stores to the memory array(s) 113 of memory module 102 via the tunneling protocol discussed herein.

Figure 1B:
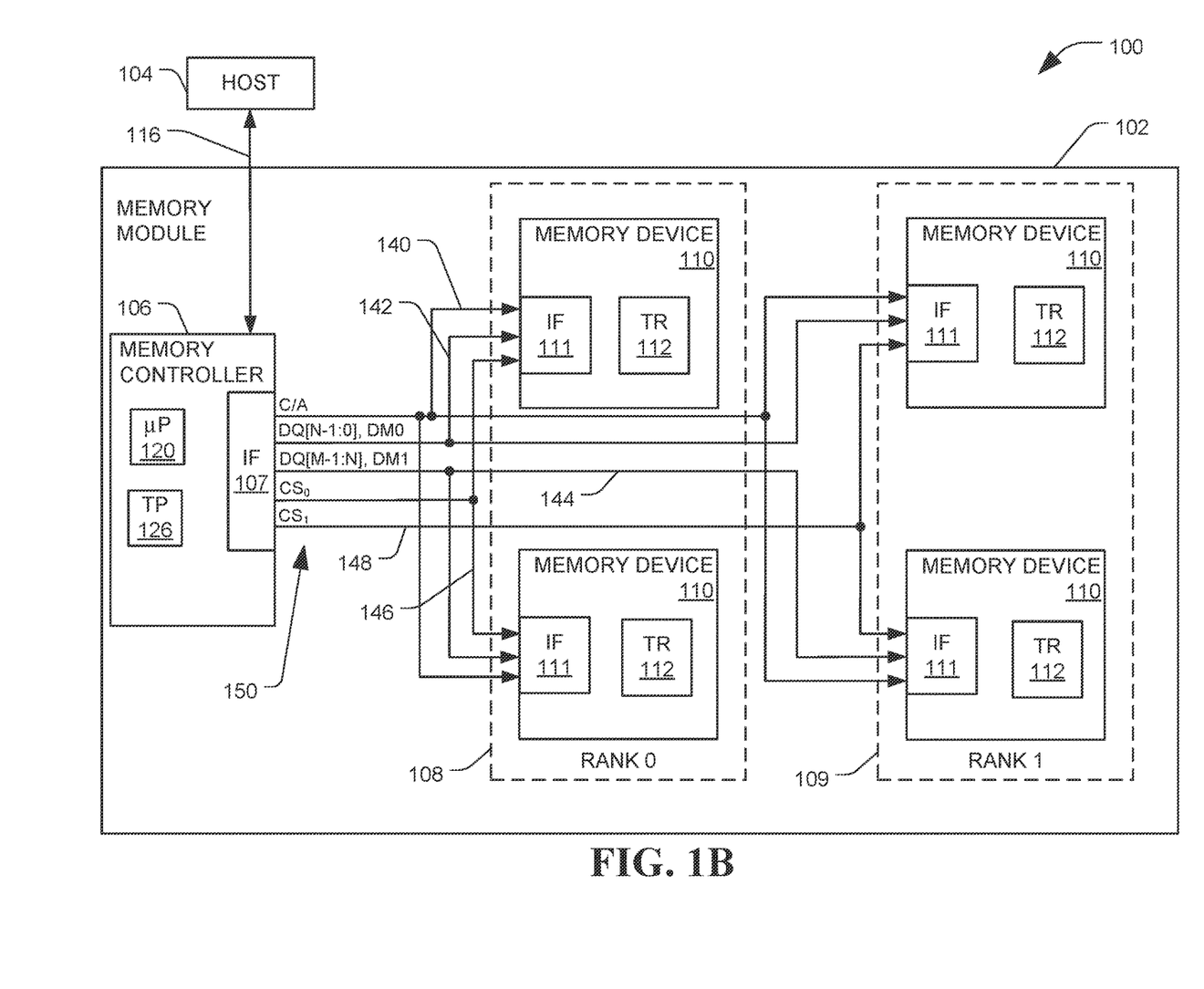
FIG. 1B is a block diagram of a system with a memory tunneling interface, in accordance with certain embodiments of the present disclosure.

Referring to FIG. 1B, an example embodiment of the system 100 is shown with further detail, with a memory controller 106 communicatively coupled to multiple memory modules 110 utilizing a standard-compliant interface 150, such as DDR5-DRAM. The memory module 102, and thus the memory controller 106, may be communicatively coupled to a host device 104 via a host interface bus 116. FIG. 1B shows how hardware can be configured to communicate to multiple memory devices. The interface 150 can include a standard command/address (CA) bus 140. The data bus (DQ) is split, with bits DQ[N−1:0] 142 attached to the upper memory devices 110, and DQ[M−1:N] 144 to the lower memory devices 110. Data mask bits DM0 and DM1 can be used to individually select which data busses are active. Chip select lines $CS_0$ 146 and $CS_1$ 148 can be used to select which rank of memories (the columns 108 and 109 in FIG. 1B) are active for communication. Using data mask bits and chip select bits, the TP 126 can communicate with a plurality of memory devices 110. Not shown, the data busses can be divided to any width supported by the standard (for example, 4-bit, 8-bit, 16-bit, etc.).

Figure 2:
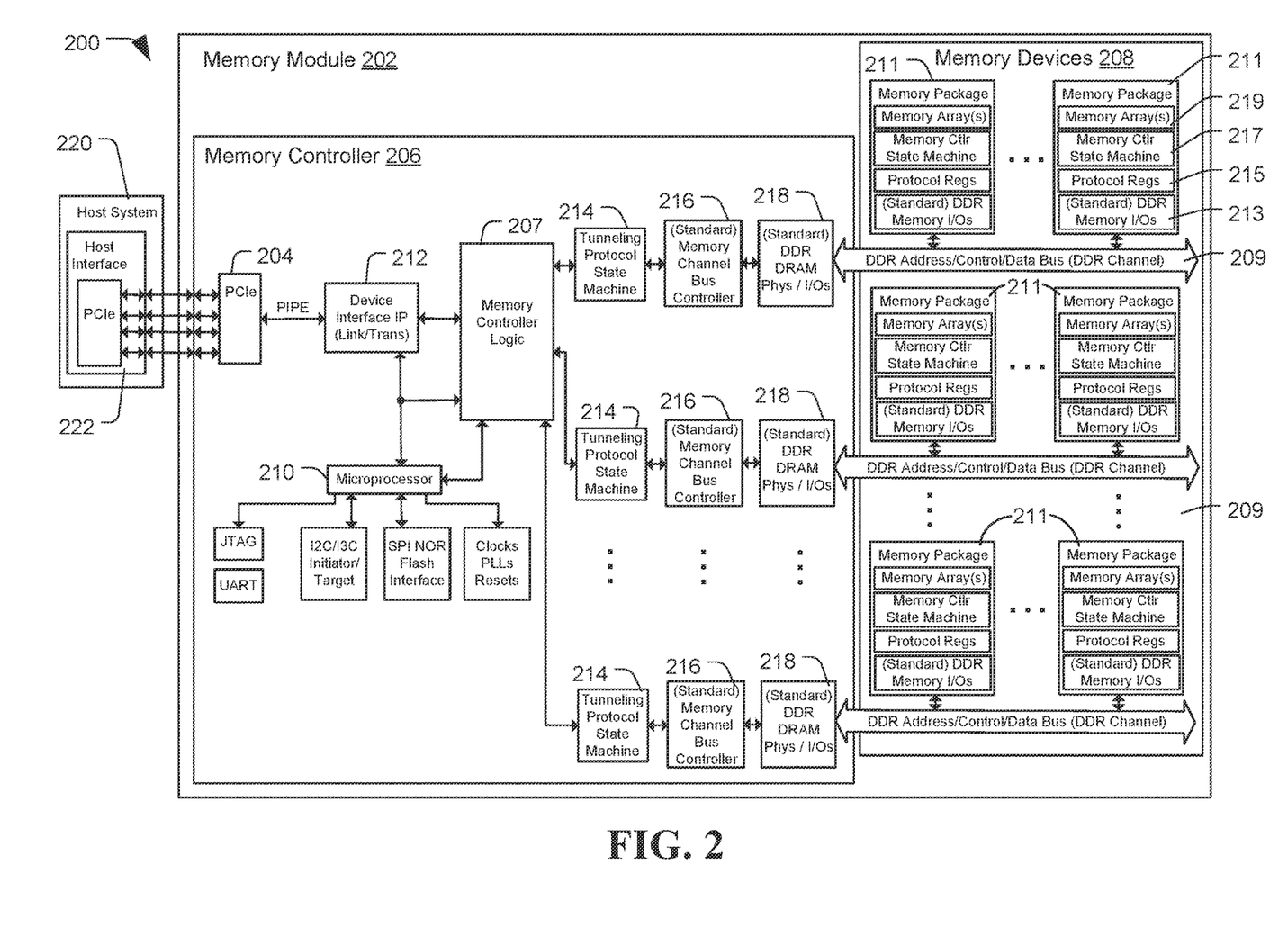
FIG. 2 is a block diagram of a system with a memory tunneling interface, in accordance with certain embodiments of the present disclosure.

Referring to FIG. 2, an example system 200 with a memory tunneling interface is shown, in accordance with certain embodiments of the present disclosure. The system 200 may be a more detailed implementation of the system 100. The system 200 can include memory module 202 that can have an interface 204 to communicate with a host system 220. The memory module 202 can include a memory controller 206 and one or more memory devices 208.

The host system 220 can be a data processing system of any type that includes a data transfer interface 222 that allows data to be transferred between the host system 220 and the memory module 202. For example, host system 220 may be a processing system for a personal computer such as a desktop or laptop, a cell phone, a server, or any other computer device. In some embodiments, the host interface 222 can be a PCIe interface utilizing the CXL protocol.

The memory controller 206 can include the interface 204, memory controller logic 207, a microprocessor 210, as well as other circuits, such as shown. Further, the memory controller 206 can include a memory controller interface 212 configured to translate communications, received or sent over the interface 204, to the memory controller logic 207. Memory controller logic 207 can switch/multiplex the operation to the appropriate data channel. Further, memory controller logic 207 can split/combine the data to and from multiple channels if desired. The memory controller interface 212 may also communicate other commands to the microprocessor 210, such as CXL.io commands in a CXL device. The memory controller 206 and memory module 202 may have other communication channels with the host system 220, such as SMBus utilizing Inter-Integrated Circuit ($I^2C$)/$I^3C$ busses for out-of-band communication of vital product data, such as performance and other characteristics of the module.

The memory controller 206 can also include one or more tunneling protocol state machines (TPSM) 214. The TPSM 214 can connect to a memory channel bus controller 216, which can connect to an input/output (I/O) circuit 218. The interface between the memory controller logic and TPSM 214 can be a high-bandwidth parallel data interface, such as the CXL-Cache/Mem Protocol Interface (CPI). The interface between the TPSM 214 and Channel bus controller 216 can be another high-bandwidth data communication channel, such as Advanced Extensible Interface 4 (AXI4). Both the bus controller 216 and the I/O circuit 218 can be compliant with a specific data memory interface standard, which can allow communications and data to be sent between a memory controller and a memory device according to the requirements of the specific interface standard, such as DDR-SDRAM5. Further, there may be any number of TPSM 214, bus controller 216, and I/O circuit 218, such as depicted.

The TPSM 214 can receive a command that came from a host, such as host system 104, host system 220, or microprocessor 120, and translate the command into one or more register access commands to perform on at least one of the registers 215 of the memory device 208. For example, the operation can be a read or write operation. The operation to the register 215 may be accomplished by reading and/or writing to specific addressable registers of one of the memory devices 208. Further, a write operation to an addressable register (e.g., an addressable logical register) can instruct the memory device 208 to perform an operation, such as a read or write operation; also, the write operation to an addressable register may store data to the register 215.

For example, the TPSM 214 may receive a write command, including corresponding data, initiated by the host 220 and translate that write command into a write of a first logical register of the memory device 208 to store the data in a holding register and also another write to another logical register to store the corresponding command to instruct the memory device 208 to perform the write with the corresponding data from the holding register to the memory array. The first logical register may be an interface addressable memory location.

The bus controller 216 converts the desired register address (for example, an AXI address) into a physical address (such as bank, bank group, row address, column address) and manages the scheduling, timing, and transfer of data to the memory devices 208. This can be accomplished through the bus 209, which can include one or more address lines, control lines, and data lines. In some examples, the bus controller 216, I/O circuit 218, and the bus 209 all comply with a same specific data interface standard, such as DDR5-SDRAM. The physical interface 218 may include timing, bus calibration, amplitude control and other circuitry required to facilitate electrical communications on the data bus 209.

The memory devices 208 may include one or more memory package 211. Each bus 209 can be coupled to one or more memory package 211. Each memory package 211 may include an interface standard compliant I/O circuit 213, tunneling registers 215, a memory state machine 217, and memory 219 for data storage, such as a memory array. In some examples, memory 219 can be an emerging memory. This can allow a memory package 211 that does not fully comply with the interface standard to be utilized with a memory controller 206 implementing the interface standard. The memory package 211 may be any physical memory having one or more attributes that do not allow attachment (e.g., communication over, etc.) to a standard memory interface, such attributes may be timing or configuration (row/page sizes, banks, capacities, etc.) that are not compliant with the memory interface standard requirements. This allows a physical memory that is not directly addressable by a memory controller to be used by that memory controller regardless of the inability for the memory controller to directly address the memory. More details on possible implementations and functions of these devices are provided below.

Figure 3:
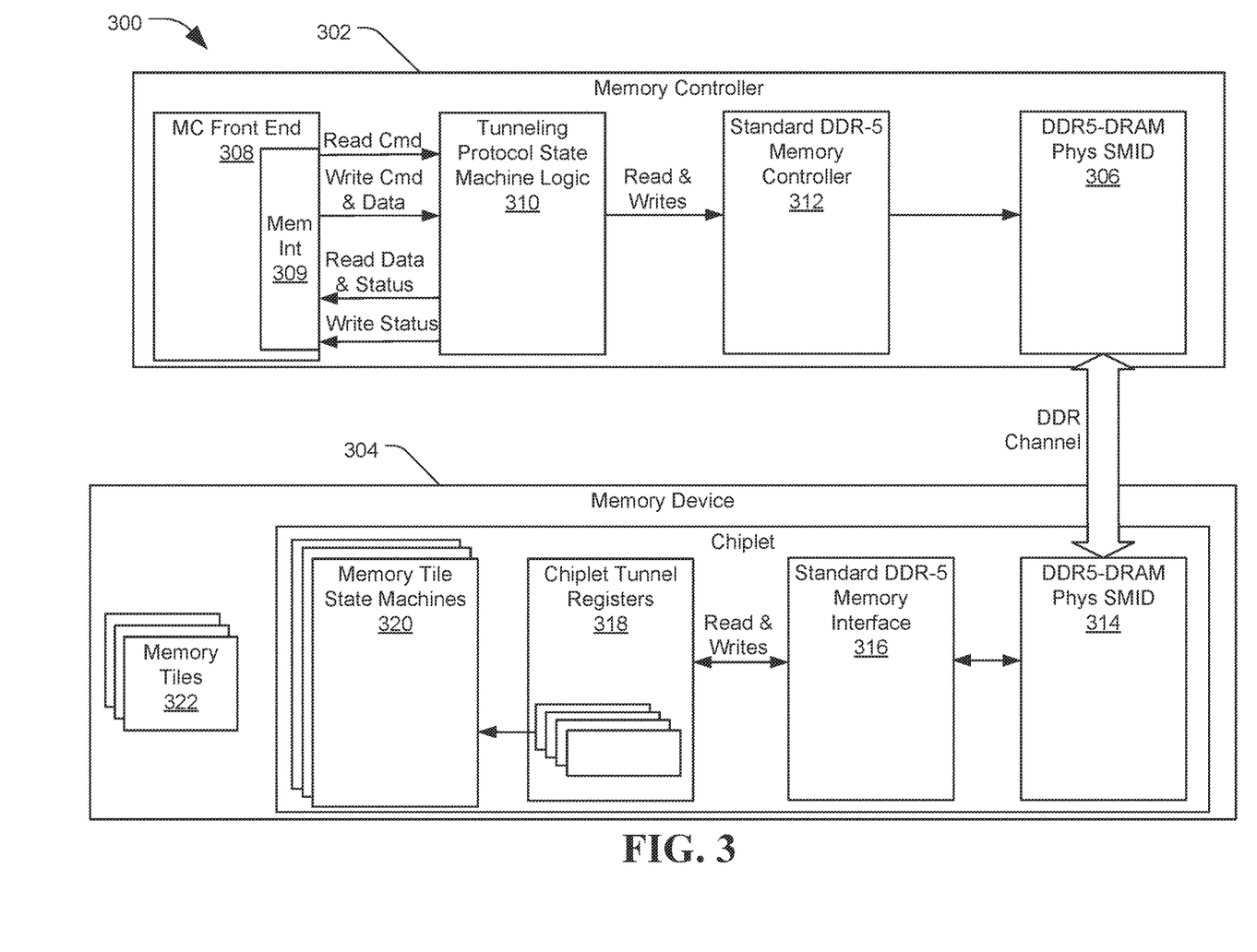
FIG. 3 is a block diagram of a system with a memory tunneling interface, in accordance with certain embodiments of the present disclosure.

Referring to FIG. 3, an example system 300 with a memory tunneling interface is shown, in accordance with certain embodiments of the present disclosure. The system 300 may be a more detailed implementation of the system 100 or system 200. The system 300 can include memory controller 302 that can have an interface 306 to communicate with a memory storage device 304. A memory controller may also be referred to as a data storage controller.

The memory controller 302 can include a memory controller front end module 308, tunneling protocol state machine logic 310, an interface standard compliant memory controller 312, and an interface standard memory interface 306.

The memory controller front end module 308 can include one or more interfaces configured to receive instructions in a pre-determined format, such as used by a processor or memory interface standard, such as CXL.mem. For example, the front-end module 308 may receive a read command or write command from a processor, where the command complies with a specific memory standard format.

The tunneling protocol state machine logic 310 can receive a command from the front-end module 308, via interface 309, and convert the command, such as a read or write command, to a register write command utilizing a memory interface standard even though the memory device 304 may not have memory array locations that comply with a memory interface standard corresponding to the command received by the front-end module. Thus, the tunneling protocol state machine logic 310 can convert a read or write command intended for a first type of physical memory device into a register write command at a second type of physical memory device. In some examples, the memory 322 may be any physical memory having one or more attributes that do not allow attachment to a standard memory interface, such attributes may be a timing or a configuration (row/page sizes, banks, capacities, etc.) that is not compliant with the memory interface standard's requirements.

The memory controller 312 can receive commands and data from the tunneling protocol state machine logic 310 in a format that is compatible with the interface standard of the memory controller 312 and the interface 306. The memory controller 312 can then manage execution of the commands and transfer of the data to or from the memory device 304.

The memory device 304 can include a standard compliant memory interface 314, which can act as queue for receiving or sending data to or from the memory device 304, an interface standard compliant memory interface 316 that can process the data received at the queue 314 for eventual storage to memory locations. The memory device 304 may also include at least one tunneling register 318, a memory array state machine 320, and one or more data storage mediums 322, such as an emerging memory. In some embodiments, the data storage mediums 322, which may also be referred to as a memory array, may include one or more data storage elements that would otherwise not comply with the interface standard of the memory interface 316.

The tunneling register(s) 318 may be fixed address register(s) that can have data stored to such by the interface 316. Mapping of tunneling and data holding registers 318 may be within a single bank to prevent inadvertent out-of-order execution caused by command-reordering/scheduling in memory controller 312. Registers may also be mapped within different columns of a single row address to minimize extra bus cycles, such as row-activate and bus precharge. Examples of possible registers are provided below. When data is stored to the tunneling register(s) 318, the memory array state machine 320 can determine actions to perform based on the data stored in the tunneling register(s) 318. These actions can include storing and retrieving data from the memory array 322.

A tunneling register 318 being written may be a logical register that is an interface addressable memory location; for example, such may be a DRAM addressable memory location (bank, bank group, row, column, etc.). Multiple registers for the functions described herein may be addressable logical registers to allow for the memory device 304 to receive data, a command, or any combination thereof. By utilizing a standardized interface to pass instructions and data through addressable registers, such a system allows multiple types of emerging memory 322 to be utilized where the memory 322 structure or control system does not fully comply with the standardized interface. This can also allow for the memory 322 not to be bound in size by the amount of addressable memory by the standardized interface.

The memory array state machine 320 can be configured to determine when a command has been written to a tunneling register 318, parse the command to determine what is to be performed, and execute the command. Details of how different commands and operations can be performed via the tunneling register(s) 318 are provided herein.

Figure 4:
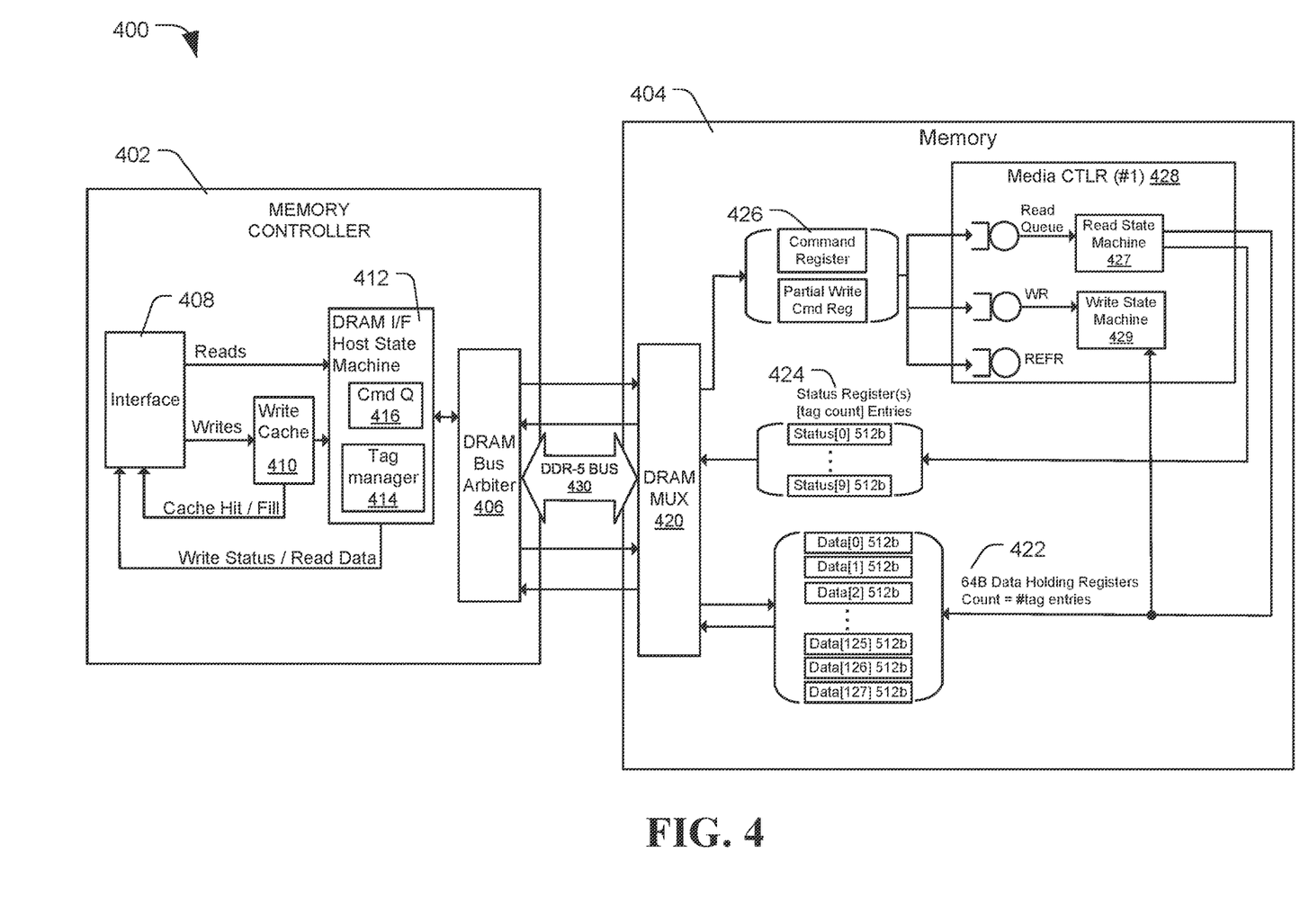
FIG. 4 is a block diagram of a system with a memory tunneling interface, in accordance with certain embodiments of the present disclosure.

Referring to FIG. 4, a logical drawing of an example system 400 with a memory tunneling interface is shown, in accordance with certain embodiments of the present disclosure. The system 400 may be a more detailed implementation of the system 100, system 200, or system 300. The system 400 can include memory controller 402 that can have an interface 406 to communicate with a memory storage device 404 via interface 420.

The memory controller 402 can include a first interface 408, a write cache 410, a state machine 412, a tag manager 414, a command queue 416, and a bus arbiter second interface 406. The first interface 408 can send and receive commands and data from a host computing device, such as host 220. The first interface 408 can selectively pass along the commands and data to the write cache 410 and the state machine 412. The write cache logic 410 can check both read requests for hits and return status or data, or both, without accessing the downstream memory 404.

The state machine 412 can receive a command via the interface 408 and convert the command, such as a read or write command, to a register write command utilizing a memory interface standard, such as a DRAM standard, even though the memory device 404 may not have memory locations that comply with the memory interface standard corresponding to the command. Thus, the state machine 412 can convert a read or write command intended for a first type of physical memory device into a register write command for a second type of physical memory device. The register write command can act as an interface pass-through of the original write command, by utilizing the register write to pass the original write command through standardized data interface controllers 406 and 420, and store the original write command, or data indicative of such, into an addressable logical register within the memory 404.

The memory storage device 404 can include a third interface 420, data holding register(s) 422, status register(s) 424, command register(s) 426, and data storage controller 428. The data holding register(s) 422, status register(s) 424, and command register(s) 426 can be addressable registers that are accessible to read and write via the interface 430. The third interface 420 can receive data and commands from the memory controller 402 via a data bus 430. Generally, data can be moved in and out of the memory 404 via the data register(s) 422, commands can be received at the command register(s) 426, and a status corresponding to a command can be stored in the status register(s) 424.

In some embodiments, write data can be placed into the data holding register(s) 422 by receiving, at the interface 420, a register writing command associated with the data holding register(s) 422, while the write command itself can be placed into the command register(s) 426 by receiving a register writing command associated with the command register(s) 426. In some embodiments, such commands and other commands may be combined as one data transfer over the data bus 430. The write command can be executed at a later time, or immediately, by the data storage controller 428 to store the incoming data to secondary location(s) in the memory 404 from the data registers 422. Further, read data can also be read from the memory 404 by receiving a register programming command at the interface 420 that writes data associated with a read command in the command register(s) 426. The read command can be executed immediately, or at a later time, to instruct the memory controller 428 to provide certain data to the data holding register(s) 422. The read data in the data holding register(s) 422 can be read from the register(s) by the memory controller 402, which may be triggered by a status stored in the status register(s) 424. A status stored in the status register(s) 424 may be retrieved by the memory controller 402 or may be sent to the memory controller 402.

In some embodiments, a write command and data associated with the write command may be sent separately over the data bus 430. For example, the memory controller 402 may first send data to the data holding register(s) 422 by writing the data into the data register(s) 422 (e.g., by programming the register); the memory controller 402 may then send a write command associated with the data in the data register(s) 422 to the command register(s) 426 (e.g., by programming the register).

The data storage controller 428 can execute read and write commands that are stored in the command register(s) 426. The data storage controller 428 may include a read state machine 427 and a write state machine 429. The read state machine 427 can manage the retrieving of the read data from the memory locations and updating the status register(s) 424 accordingly. For example, the read state machine may also wait until the read data is in the data holding register(s) 422 before setting the status in the status register(s) 424. The write state machine 429 can manage the storing of write data, stored in the data holding register(s) 422, to the memory locations of memory 404.

Figure 5:
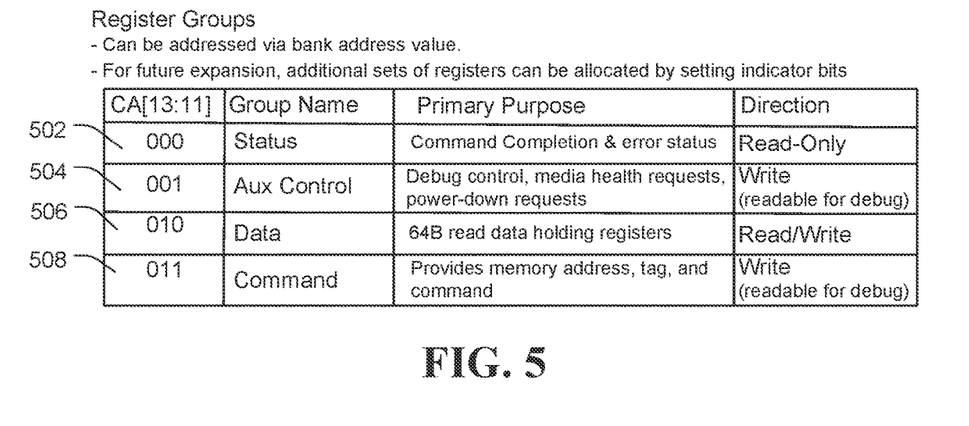
FIG. 5 illustrates example register groups, in accordance with certain embodiments of the present disclosure.

Referring to FIG. 5, example register groups are illustrated, in accordance with certain embodiments of the present disclosure. Register groups 502-508 are addressed by column address values (CA[13:11]). Other interface mappings are possible, including using bank address and bank groups, but care must be taken to ensure that the design's memory controller executes commands in-order to avoid data hazards. In some embodiments, the register groups may include a status register group 502, an auxiliary control register group 504, a data register group 506, and a command register group 508.

The status register group 502 can be one or more registers that the memory device stores status information, such as a command completion status or error status, to and is accessible by the memory controller by reading the address of the specific register(s). Further, in some embodiments, the status register group 502 may be read-only from the perspective of the memory controller, that is, the memory controller may not write to the status group register(s).

The auxiliary control register group 504 can be one or more registers that the memory controller can access to store non-data transfer commands to. For example, the memory controller can utilize the auxiliary control register group 504 for debugging control, media health requests, and power-down requests. Further, in some embodiments, the auxiliary control register group 504 may be writeable by the memory controller and readable by the memory controller, such as for use in debugging. Once an auxiliary control operation is stored into the auxiliary control register group 504 by the memory controller, the memory device can perform any corresponding operations at the memory device based on the stored auxiliary control operation.

The data register group 506 can be one or more registers that the memory controller can access to store data to for eventual storage in the memory array of the memory device. The data holding register(s) of the data register group 506 can be utilized for transferring of data from the memory controller to the memory device or vice versa. For example, during a write operation, the memory controller can store data to the data holding register(s) of the data register group 506, which data can later be transferred to a different level of the memory array within the memory device, such as the data being moved, by the memory device logic, from the data holding register(s) and stored in nonvolatile memory of the memory device. In a further example, during a read operation, the memory device may store data to the data holding register(s) of the data register group 506 for eventual transfer of the data to the memory controller.

The command register group 508 can be one or more registers that the memory controller can access to store command(s) for the memory device to execute. For example, the memory controller may store a read or write command(s) in the command register group, which may correspond with usage of the data register group as data holding registers for the read or write command. Further, a memory address and a unique tag number associated with the read or write command may be stored in the command register group 508. The unique tag number allows the memory device to identify which command in the command register(s) corresponds to which data in the data holding registers, such as shown in the example below. The logic or processing system of the memory device may detect and determine what command is in the command register group 508, and then proceed to perform the operation or provide an error status, such as via status register group 502.

In some embodiments, the registers may be reconfigured, such as contracted or expanded, by removal or addition of registers being allocated to a group. Examples of some embodiments of registers and their usage are provided below.

Figure 6:
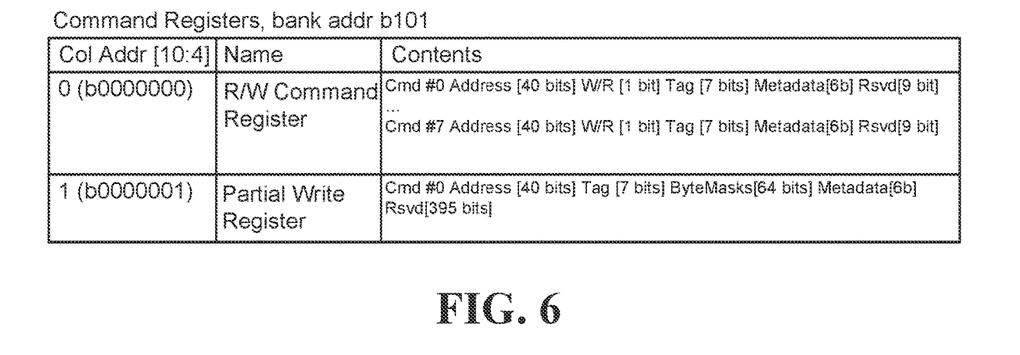
FIG. 6 illustrates example command registers, in accordance with certain embodiments of the present disclosure.

Referring to FIG. 6, example command registers are illustrated, in accordance with certain embodiments of the present disclosure. In the example shown, the command registers may have a read/write (R/W) command register and a partial write command register. The example command registers of FIG. 6 can be an example of the command register group 508.

In the embodiment shown, a single primary command register may be used for incoming commands, each having a tag number. The memory controller can issue multiple commands in one data transfer, such as eight commands on a 64-byte transfer. Write and read commands can be intermixed. The memory device will process the commands in the register and provide a status, read data, or both to the memory controller via the other register groups as described herein. Metadata bits are available to store ancillary data, such as data "Poison" bits, cache line status, etc.

Figure 7:
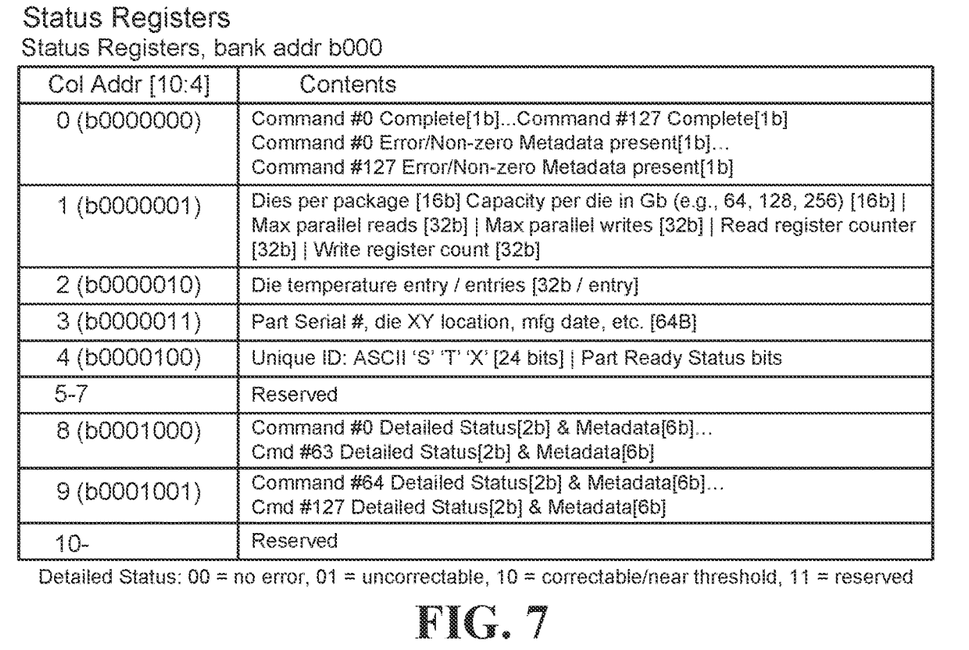
FIG. 7 illustrates example status registers, in accordance with certain embodiments of the present disclosure.

Referring to FIG. 7, example status registers are illustrated, in accordance with certain embodiments of the present disclosure. In the example shown, the status registers may store information that is accessible by the memory controller. For example, a register may show the command (s) completion status, information related to the capacity or physical structure(s) of the memory device, memory temperature, serial number, location of memory within the memory device, manufacturing date, a unique identification number, or detailed status. Further, the status registers may be allocated to be expanded if further status information is needed or deallocated if a register needs to be repurposed. The example status registers of FIG. 7 can be an example of the status register group 502.

Figure 8:
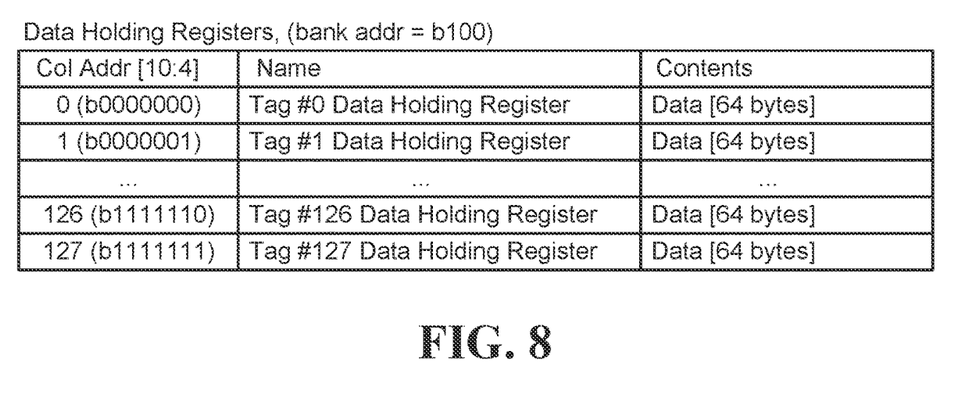
FIG. 8 illustrates example data holding registers, in accordance with certain embodiments of the present disclosure.

Referring to FIG. 8, example data holding registers are illustrated, in accordance with certain embodiments of the present disclosure. In the example shown, each data holding register may store data associated with a single specific command stored in the command register(s), which association may be accomplished via a unique tag number. The memory controller may access the data holding registers to store or read the data address, tag number, and data to or from the memory device, respectively. The memory device may access the data holding registers to transfer data out of or into the registers based on a corresponding write or read command received in the command register(s). The data holding registers of FIG. 8 can be an example of the data holding register group 506.

Many variations would be apparent in view of this disclosure. Components and circuits used to perform the operations and functions described herein may be discrete, integrated into a system on chip (SoC), or a combination thereof. Further, the operations and functions described herein can be carried out in a processor (e.g. a digital signal processor), implemented in software, implemented via firmware, or by a combination of processors, software, and circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a memory controller including:
      a first interface configured to receive a command from a processor, the command intended for a physical memory that is not directly addressable by the memory controller;
      a state machine configured to convert the command into a register access command that includes a write to a register associated with the physical memory;
      a second interface configured to be coupled, via a data bus, to a memory device including the physical memory, the second interface further configured to allow data to be stored to and retrieved from the physical memory via writing the register access command to the register;
   the memory device, including:
      the register; and
      a second state machine configured to determine when a command is stored in the register and perform a data storage operation on the physical memory based on the command.

2. The apparatus of claim 1 further comprising the first interface includes a processor standard interface and is configured to receive the command from the processor as defined by requirements of the processor standard interface.

3. The apparatus of claim 1 further comprising the second interface includes a memory standard interface and the memory controller is configured to store and retrieve data from the memory device via the second interface according to requirements of the memory standard interface.

4. The apparatus of claim 1 further comprising the state machine includes logic circuits configured to convert the command.

5. The apparatus of claim 3 further comprising:
   the memory device, further including:
      a third interface configured to operate per the requirements of the memory standard interface, wherein the register is configured to be accessed via the third interface;
      the physical memory.

6. The apparatus of claim 5 further comprising:
   the second interface and the third interface comply with requirements of a Double Data Rate (DDR) Dynamic Random Access Memory (DRAM) standard; and
   the register is an addressable logic register accessible via the DDR DRAM standard's protocol.

7. The apparatus of claim 5 further comprising:
   the memory device including:
      a command register;
      a data register; and
      the second state machine configured to determine when a command is stored in the command register and execute an operation based on the command including when a read operation is executed, data from the physical memory is stored in the data register for transfer to the memory controller and when a write operation is executed, data previously stored to the data register is stored to the physical memory.

8. The apparatus of claim 6 further comprising the physical memory is not fully compliant with the DDR DRAM standard.

9. The apparatus of claim 7 further comprising the memory device including a status register accessible by the memory controller and configured to store data indicating a status of a command.

10. A device comprising:
    a memory device including:
       physical memory that does not meet a requirement of a memory standard;
       a first interface configured to operate per requirements of the memory standard;
       a register configured to be accessed by a memory controller via the first interface;
       a first state machine configured to determine when a command from the memory controller is stored in the register and perform a data storage operation on the physical memory based on the command;
    the memory controller, including:
       a second interface configured to receive a command from a processor, the command intended for the physical memory that is not directly addressable by the memory controller;
       a second state machine configured to convert the command into a register access command that includes a write to the register associated with the physical memory; and
       a third interface configured to be coupled, via a data bus, to the memory device including the physical memory, the third interface further configured to allow data to be stored to and retrieved from the physical memory via writing the register access command to the register.

11. The device of claim 10 further comprising:
    the memory device including:
       a command register;
       a data register; and the first state machine configured to determine when a command is stored in the command register and execute an operation based on the command, including when a read operation is executed, data from the physical memory is stored in the data register for transfer to the memory controller and when a write operation is executed, data previously stored to the data register is stored to the physical memory.

12. The device of claim 10 further comprising:
the first interface and the third interface comply with requirements of a Double Data Rate (DDR) Dynamic Random Access Memory (DRAM) standard; and
the register is an addressable logic register accessible via the DDR DRAM standard's protocol.

13. The device of claim 11 further comprising the memory device including a status register accessible by the memory controller and configured to store data indicating a status of a command.

14. The device of claim 12 further comprising a size of the physical memory is larger than a number of addressable memory locations of the memory standard.

15. An apparatus comprising:
a memory device including:
  physical memory having an attribute that does not allow attachment to a memory standard;
  a first interface configured to operate per requirements of the memory standard;
  a register configured to be accessed by a memory controller via the first interface;
  a first state machine configured to determine when a command from the memory controller is stored in the register and perform a data storage operation on the physical memory based on the command;
the memory controller, including:
  a second interface configured to receive a command from a processor, the command intended for storing data to or retrieving data from the physical memory of the memory device;
  a second state machine configured to convert the command into a register access command that includes a write to the register of the memory device; and
  a third interface configured to be coupled to the first interface via a data bus and allow data to be stored to and retrieved from the memory device via writing the register access command to the register.

16. The apparatus of claim 15 further comprising:
the memory device including:
  a command register;
  a data register; and
  the first state machine configured to:
    determine when a command is stored in the command register;
    execute an operation based on the command, including:
      when a read operation is executed, data from the physical memory is stored in the data register for transfer to the memory controller; and
      when a write operation is executed, data previously stored to the data register is stored to the physical memory.

17. The device of claim 16 further comprising the memory device including a status register accessible by the memory controller and configured to store data indicating a status of a command.

18. The device of claim 16 further comprising:
the first interface and the third interface comply with requirements of a Double Data Rate (DDR) Dynamic Random Access Memory (DRAM) standard; and
the register is an addressable logic register accessible via the DDR DRAM standard's protocol.

19. The device of claim 18 further comprising the physical memory is not directly accessible via the DDR DRAM standard.

* * * * *